March 21, 1939. C. S. LORD 2,151,431
VEHICLE BODY TRANSPORTATION MOUNTING APPARATUS AND METHOD
Filed June 14, 1937 3 Sheets-Sheet 1
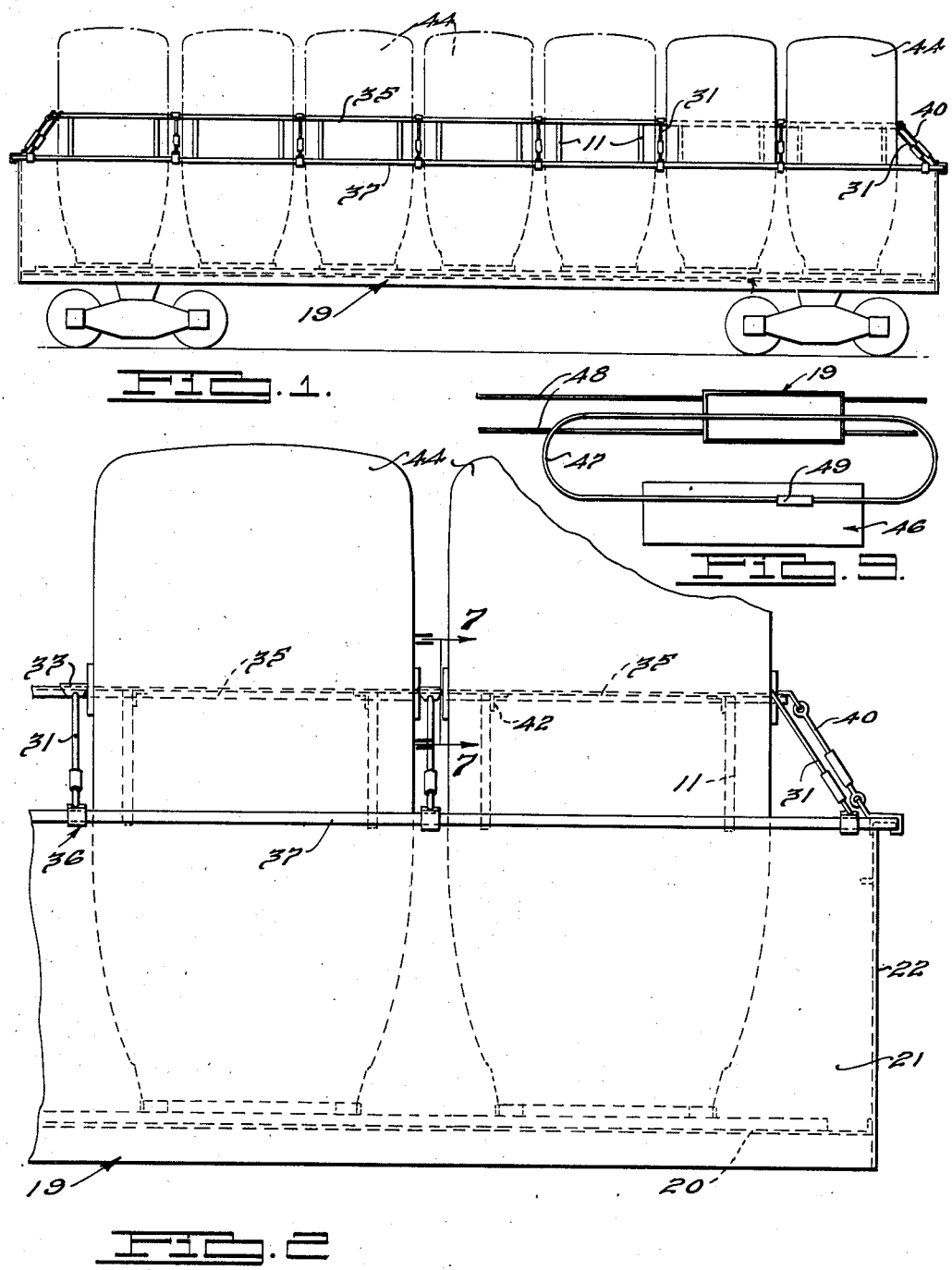
INVENTOR
CHARLES S. LORD.
BY
Harness, Dind, Pattee & Harris.
ATTORNEYS.

March 21, 1939.  C. S. LORD  2,151,431

VEHICLE BODY TRANSPORTATION MOUNTING APPARATUS AND METHOD

Filed June 14, 1937  3 Sheets-Sheet 2

INVENTOR
CHARLES S. LORD.
BY
ATTORNEYS.

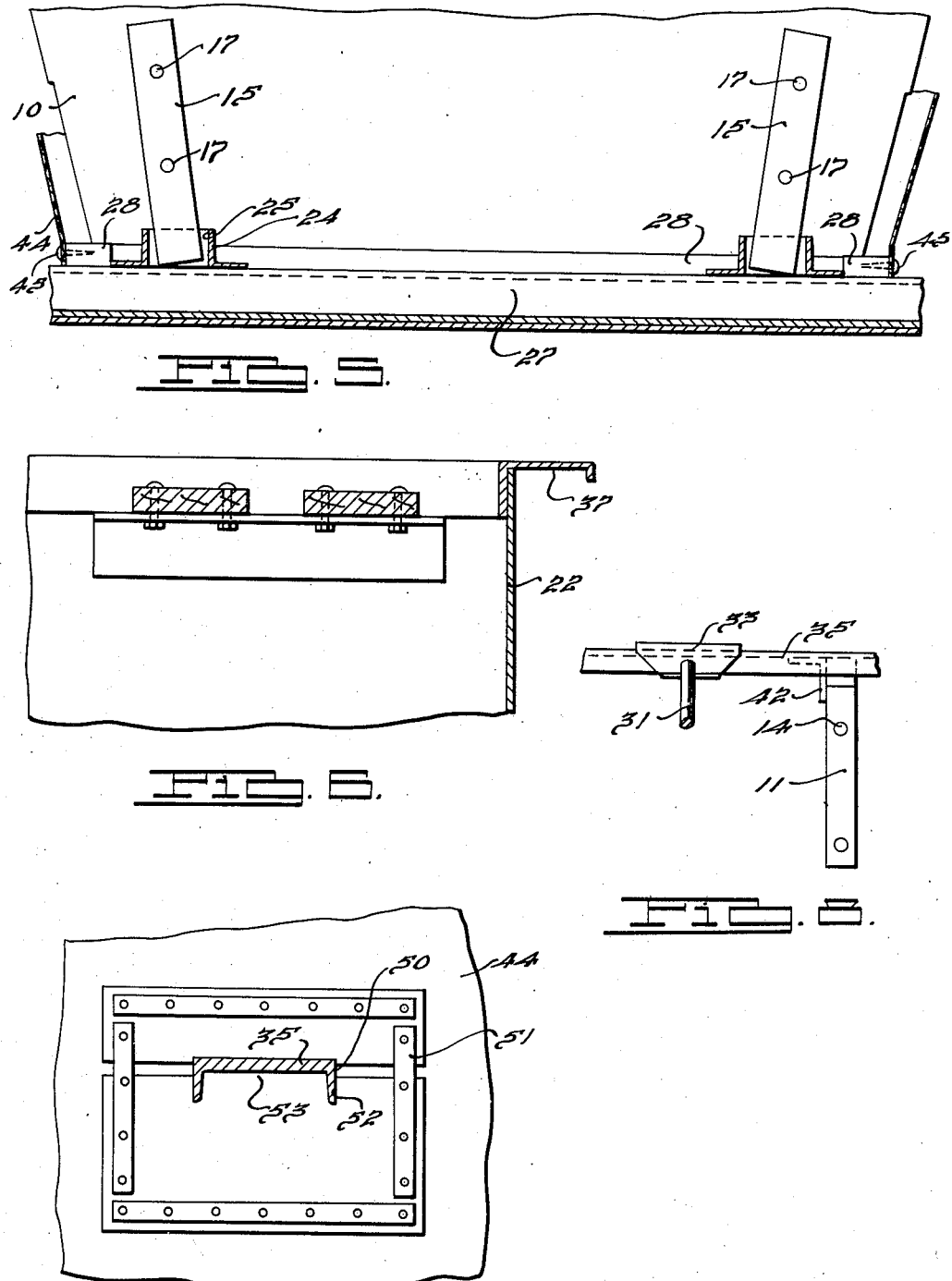

Patented Mar. 21, 1939

2,151,431

UNITED STATES PATENT OFFICE 2,151,431

VEHICLE BODY TRANSPORTATION MOUNTING APPARATUS AND METHOD

Charles S. Lord, Detroit, Mich., assignor to Chrysler Corporation, Highland Park, Mich., a corporation of Delaware Application June 14, 1937, Serial No. 148,030

14 Claims. (Cl. 105—368)

This invention relates to an improved method and apparatus for mounting vehicle bodies in railroad cars for transportation therein.

One of the main objects of the invention is to provide a method of this kind by which substantially all of the space within, and immediately above a freight car of the open gondola type can be utilized for the accommodation of vehicle bodies.

Another object of the invention is the provision of a vehicle body transportation mounting of this character which accommodates loading of vehicle bodies into a gondola through the normally open upper extremity thereof.

A further object of the invention is the provision of a vehicle body transportation mounting by which a pair of detachably secured together vehicle bodies may be handled as a unit during loading and unloading operation.

Still further objects of the invention are the provision of means in a mounting of this character for detachably securing a pair of vehicle bodies together and which also serve as piloting and securing means for properly locating the vehicle bodies and holding the same against displacement, respectively; to provide re-useable means of this kind for temporarily securing a pair of vehicle bodies together in protected, spaced relationship with respect to each other; and to provide improved anchoring apparatus for fixing the vehicle bodies to the freight car structure which may be readily applied to freight cars of conventional construction without requiring radical change in the structure thereof or otherwise impairing the normal freight-carrying capacity of the cars.

Additional objects of the invention are the provision of improved apparatus in a vehicle body transportation mounting for tying the vehicle bodies to upper extremities of the side walls of a gondola; to provide coupling hook members in tying apparatus of this character which may be readily attached to and detached from the structure of a gondola without requiring alteration of the latter; to provide means in tying apparatus of this kind which is adapted to coact with the members by which the bodies are attached together in order to obviate the requirement of direct attachment of the tying apparatus to the structure of the body.

A further object of the invention is the provision of improved means for substantially completely enveloping detachably secured together bodies of this character in order to protect them during transit.

Still further objects of the invention are the provision of improved car loading apparatus and a car loading method whereby the bodies may be deposited by mechanical conveying and hoisting apparatus directly in their proper positions in a freight car without requiring manual handling of the body; and to provide a vehicle body transportation mounting of the foregoing character which accommodates supporting of a pair of vehicle bodies on end with portions thereof which constitute their dash boards and which are not highly finished or painted, serving as the supporting portions of the body.

An illustrative embodiment of the invention is shown in the accompanying drawings, in which:

Fig. 1 is a side elevation of a gondola type freight car provided with vehicle body transportation mounting apparatus embodying the invention and showing, in dotted lines, a plurality of vehicle bodies mounted therein.

Fig. 2 is a fragmentary, enlarged, side elevational view of the right end portion of the freight car and vehicle body mounting illustrated in Fig. 1.

Fig. 5 is a fragmentary, longitudinal, vertical, central, sectional view taken on the line 5—5 of Fig. 3.

Fig. 6 is a fragmentary, longitudinal, vertical sectional view taken on the line 6—6 of Fig. 3.

Fig. 7 is a fragmentary, transverse, vertical sectional view taken on the line 7—7 of Fig. 2.

Fig. 8 is a fragmentary, longitudinal, vertical sectional view taken on the line 8—8 of Fig. 4.

Fig. 9 is a diagrammatic, illustrational plan view of a loading dock adapted for the mounting of vehicle bodies for transportation in gondola type of freight cars in accordance with the invention.

Figures 3, 4:
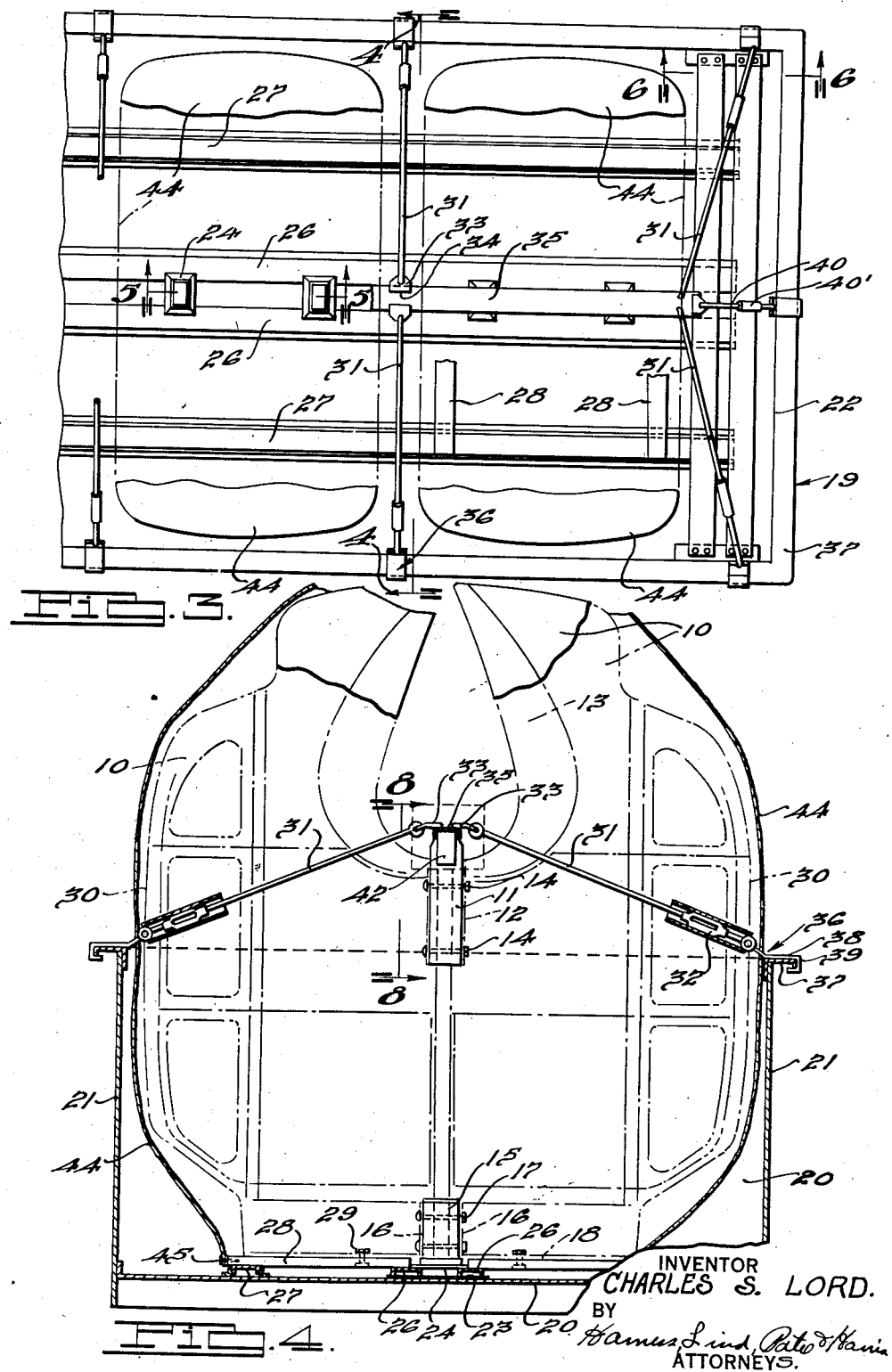
Fig. 3 is a fragmentary plan view of the right end portion of the freight car vehicle body mounting shown in Fig. 1.
Fig. 4 is a transverse, vertical, sectional view taken on the line 4—4 of Fig. 3.

In the form of the invention illustrated in the drawings, a pair of vehicle bodies, illustrated in dotted lines and designated by the numeral 10, are detachably secured together with their normal lower extremities in spaced facing relationship, as illustrated in Fig. 4. This is accomplished preferably by disposing a block 11 at each side of the bodies between flange portions 12 of the lower extremities thereof which are normally provided for attachment of the vehicle body to a chassis frame. The blocks 11 extend beyond the forward-most extremities of the wheel housing portions 13 of the vehicle bodies and they are secured to the flange portions 12 thereof by bolts 14 extending through the apertures which are normally provided for the attachment of the vehicle bodies to a chassis frame. One block 11 is disposed between each of the correspondingly opposite lower end portions of the vehicle bodies and the upper end of each block extends into the space enveloped by the wheel housing portions 13 of the vehicle bodies. A second spacing block 15 is disposed between flange portions 16 of the lower extremities of the vehicle bodies 10 and secured to the flanges 16 by bolts 17, the flanges 16 and the apertures through which the bolts 17 extends, being normally provided for attachment of the vehicle body to a chassis frame. A block 15 is placed between opposite corresponding side portions of the vehicle bodies 10 and each block extends beyond the front extremities of the vehicle bodies at which the dash boards, designated by the numeral 18, are disposed.

A plurality of vehicle bodies detachably secured together in the manner illustrated in Fig. 4, may be arranged in alignment longitudinally of a gondola type freight car, designated by the numeral 19 in the drawings. The freight car 19 which comprises a horizontal floor portion 20, spaced substantially vertical side walls 21, and end walls 22, may be conveniently conditioned for reception of the detachably secured together pairs of vehicle bodies and the parts of the transportation mounting apparatus attached thereto by providing at the center of the floor 20 of the freight car a longitudinally extending metal plate 23 and spaced pairs of socket members 24 which are also aligned longitudinally of the freight car. The socket members 24 may be welded or otherwise suitably secured to the plate 23. Each socket member 24 has a substantially rectangular passage 25 therein for receiving one of the lowermost blocks 15 by which the front end portions of the vehicle bodies 10 are detachably secured together in spaced relationship.

Extending along the opposite sides of the socket members 24 throughout substantially the length of the freight car 19 are a pair of inverted channel bars 26 which are riveted, welded, or otherwise suitably secured to the plate 23. A pair of spaced angle bars 27 also extend longitudinally of the floor of the car, one being located between the longitudinal central plane of the freight car and each side wall 21 thereof respectively. A supporting plate 28 is detachably secured to the dash board 18 of each vehicle body 10 by bolts 29. These supporting plates preferably comprise wood and they are disposed adjacent the front side surface of the dash board 18.

The co-action between the body-securing blocks 15 and the sockets 24 in which their lower end portions are received holds the end portions of the detachably secured together pairs of bodies against horizontal movement relative to the floor of the freight car 19. These sockets, it is to be understood, are so located as to space the back portions 30 of the vehicle bodies 10 from the side walls 21 of the freight car in order to protect the vehicle bodies against injuries.

The normal rear end portions of the vehicle bodies 10 which are located in the space immediately above the upper open extremity of the freight car 19, are securely held against movement and in spaced relationship with respect to the side walls of the freight cars by tension members comprising links 31 having turn knuckles 32 intermediate their ends. A pair of links 31 are disposed between successively adjacent pairs of vehicle bodies 10, as illustrated in Fig. 3, and each link 31 is provided at its inner end with a hook 33 which is engageable in a slot 34 formed in a channel-shaped rail member 35 which extends longitudinally of the freight car 19 and which is mounted upon the upper extremities of the blocks 11 by which the rear ends of the vehicle bodies are detachably secured together. The rail 35 extends through the space enveloped by the wheel housing portions 13 of the vehicle bodies 10 and is provided with a downwardly disposed channel in which are disposed the upper tapered end portions of the blocks 11 of all the pairs of vehicle bodies arranged in the freight car.

Provided on the outer end portions of the links 31 are hooks, generally designated by the numeral 36, which are adapted to be detachably connected with a flange 37 provided around the upper open extremity of the freight car 19. Each hook 36 comprises an intermediate body portion 38 which conforms to the upper side surface of the flange 37 and is adapted to seat thereon. Formed on the outer end portions of the hooks 37 are reversely-bent portions 39 which surround the outer edges of the flange 37 and extend in underlying relationship with respect to the intermediate portions 38 of the hook. The upper extremities of the blocks 11 and the channel rail 35 mounted thereon are preferably disposed at an elevation above the elevation of the flange 37 so that when the links 31 are placed under tension, they urge the detachably secured together bodies 10 downwardly toward the floor 20 of the freight car and at the same time exert laterally extending oppositely directed force components thereon by which the vehicle bodies are stabilized against lateral movements and held in spaced relationship with respect to the walls of the freight car 19.

Links 40, substantially identical in construction to the links 31, are connected between the extremities of the channel-shaped rail 35 and the associated end wall 20 of the freight car 19. The links 40 are provided with turn knuckles 40' by which they may be tensioned in order to hold the rail 35 and the vehicle bodies against endwise movement. The links 40 are also disposed at a downward inclination with respect to a horizontal plane and they therefore exert horizontal force components directed oppositely and lengthwise of the freight car and at the same time urge the end portion of the rail 35 downwardly to assist in maintaining the supported ends of the vehicle bodies in firm engagement with the supports therefor which are mounted on the floor of the freight car.

Shifting of the rail 35 longitudinally relative to the blocks 11 is prevented by angle members 42 mounted in suitably spaced relation on the rail 35 so as to be engageable with the opposite side faces of adjacent blocks 11 of successive pairs of vehicle bodies 10, as illustrated in Fig. 2.

After a pair of vehicle bodies have been secured together in the foregoing manner, they are mounted on their front ends, in substantially vertically upstanding positions, as illustrated in Fig. 4, with the supporting plates 28 resting upon the channel-shaped rails 26 and 27. If it is desired to enclose the bodies in order to protect them during transit, a flexible bag-shaped envelope 44 may be disposed over each pair of bodies before they are placed in the freight car. The open end of the bag-shaped envelope 44 is preferably disposed downwardly and tacked to the supporting plates 28, as illustrated at 45 in Fig. 4.

The assembling of the bodies in pairs may be conveniently accomplished at a loading station, generally designated by the numeral 46 in Fig. 9, over which a continuous mono-rail or other endless conveying system 47 extends. A side track, generally designated by the numeral 48, is disposed in substantially parallel relationship with respect to the length of the loading platform 46 and directly below one side of the endless conveying system 47. An empty freight car 19 of the gondola type having an open upper extremity may be moved along the side track 48 into a suitable position adjacent the loading platform 46 and below one side of the conveyor 47. Each pair of bodies to be mounted for transportation in the freight car 19 may be hoisted from the platform 46 by engaging suitable hooks, not shown, of a travelling crane 49 and in the lower extremities of the blocks 11. After the bodies have been lifted to an elevation sufficiently high to clear the upper extremity of the walls of the freight car 19, they may be translated along the monorail track of the conveying system 47 and to a position directly above the space in the freight car 19 intended for their accommodation. The bodies may then be lowered by manipulation of the travelling crane 49 and guided into their proper positions so as to bring the lower extremities of the blocks 15 into their respective sockets 24. When the bodies are enclosed within a bag comprising heavy paper or other suitable flexible material, provision may be made therein for the insertion of the hooks of the travelling crane 49 therethrough.

When the freight car 19 has been loaded to capacity with longitudinally aligned pairs of vehicle bodies having their combined normal height disposed substantially transversely of the freight car, the channel-shaped rail 35 is inserted longitudinally through the aligned space enveloped by the rear wheel housing portions 13 and seated upon the tapered upper extremities of the securing blocks 11 with the channel side of the rail 35 disposed downwardly. A pair of tension links 31 is then disposed between adjacent pairs of vehicle bodies 10 with the hooks 33 of their inner ends inserted through the slots 34 of the rail 35, and the hooks 36 of their outer extremities engaged upon the flange 37 of the longitudinal side walls of the freight car. The link 31 may then be tensioned to hold the vehicle bodies in spaced relation to the side walls 21 of the freight car by operation of the turn knuckles 40' thereof. The end links 40 may then be connected, in a similar manner, between the extremities of the rails 35 and the end walls 20 of the freight car 19, respectively. A pair of transversely extending tension links 31 may also be provided between the opposite end portions of the rail 35 and the longitudinal side walls of the freight car, as illustrated in Fig. 3. This latter pair of tension links are preferably disposed at an inclination with respect to the length of the freight car in order to assist the end links 40 in holding the rail 35 and bodies connected thereby against longitudinal displacement.

Registering slots 50 are preferably provided in the sides of the flexible covering members 44 to accommodate the passage of the rail 35 therethrough. The slots 50 are preferably provided with reinforcing cleat 51 comprising either rigid or relatively flexible material of comparatively greater strength than the material of the flexible envelope and these cleats may be riveted, stapled, glued, or otherwise suitably secured to the flexible covering material. Branch slot 52 may be formed in the flexible covering material to accommodate the flange portion of the channel-shaped rail 35 and to provide a relatively flexible tongue portion 53 which may be deflected to accommodate the passage of the angle members 42 carried by the channel-shaped rail 35 through the covering members during longitudinal insertion of the rail 35 through the series of aligned pairs of vehicle bodies.

The foregoing vehicle body transportation mounting apparatus and method facilitates utilization of substantially all of the vehicle body accommodating space within the freight car 19 as well as the space directly thereabove. By depositing the successive pairs of vehicle bodies on end while suspended in a vertically upright position, loading of vehicle bodies in freight cars is greatly expedited and may be accomplished without requiring manual manipulation of the bodies to their intended positions, all of this work being done mechanically by the travelling crane 49. The mounting apparatus may be re-used and inasmuch as it requires very little space for its accommodation, a plurality of units of the mounting apparatus may be returned to the factory in which vehicle bodies are constructed in one freight car while the other freight car may be utilized for general shipment of freight. Substantially no revision of the construction of the freight car is required to permit the use of the improved mounting apparatus and therefore cars of general construction may be used when needed for the shipment of vehicle bodies in accordance with the invention.

Although but one specific embodiment of the invention is herein shown and described, it will be understood that various changes in the size, shape and arrangement of parts may be made without departing from the spirit of my invention.

What I claim is:

1. The method of mounting vehicle bodies for transportation in a freight car which comprises detachably securing together a pair of vehicle bodies with their normal lower extremities in spaced facing relationship by connecting together portions thereof normally provided for attachment to a vehicle chassis, disposing said detachably secured together bodies on end in said freight car with their combined normal heights extending transversely thereof, holding the supporting ends of said bodies against horizontal displacement, and urging said bodies downwardly toward the floor of said freight car and stabilizing unsupported end portions thereof against movement by tying the same under tension in substantially opposite directions from locations on said freight car to points on said bodies above said locations.

2. The method of mounting vehicle bodies for transporation in a freight car which comprises detachably securing together a pair of vehicle bodies with their normal lower extremities in spaced facing relationship by providing connecting means between parts of said bodies at opposite end portions thereof normally employed for attachment to a vehicle chassis, disposing said detachably secured together bodies on end in said freight car with their combined normal heights extending transversely thereof, holding the supporting ends of said bodies against horizontal displacement by confining said connecting means of said supporting end portions of said bodies against horizontal displacement, and urging said bodies downwardly toward the floor of said freight car and stabilizing unsupported end portions thereof against movement by tying the same under tension in substantially opposite directions from locations on said freight car to points on said bodies above said locations.

3. The method of mounting vehicle bodies for transportation in a freight car which comprises detachably securing together a pair of vehicle bodies with their normal lower extremities in spaced facing relationship by providing connecting means between parts of said bodies at opposite end portions thereof normally employed for attachment to a vehicle chassis, disposing said detachably secured together bodies on end in said freight car with their combined normal heights extending transversely thereof, holding the supporting ends of said bodies against horizontal displacement by confining said connecting means of said supporting end portions of said bodies against horizontal displacement, and urging said bodies downwardly toward the floor of said freight car while simultaneously stabilizing the upper end portions thereof against movement by tying the same under tension in substantially opposite directions from the connecting means of the unsupported end portions of said bodies to locations on said freight car therebelow.

4. The method of mounting vehicle bodies in a freight car which comprises detachably securing together a plurality of pairs of vehicle bodies with their normal lower extremities in spaced facing relationship by providing spacing and connecting means between registering parts of the bodies at opposite end portions thereof, disposing said plurality of pairs of vehicle bodies on end and substantially in alignment longitudinally of said freight car with the combined heights of the bodies of each pair extending transversely of said freight car, holding the supporting ends of said bodies against horizontal displacement by confining said connecting and spacing means of said supporting end portions against horizontal displacement, connecting together the connecting and spacing means of the opposite end portions of said bodies by a beam member extending longitudinally of said freight car, and urging said bodies downwardly toward the floor of said freight car while simultaneously stabilizing the upper end portions thereof against movement by tying the same under tension in opposite directions from said beam to locations on said freight car therebelow.

5. The method of mounting vehicle bodies in a freight car having an open upper extremity which comprises detachably securing together a plurality of pairs of vehicle bodies with their normal lower extremities in facing relationship, successively depositing each pair of bodies on end in said freight car in spaced relation to the walls thereof with the combined heights of the bodies of each pair disposed substantially transversely thereof by passing said bodies endwise through the open extremity of said freight car, and fixing said detachably secured together pairs of bodies in spaced relation with respect to each other and relative to the walls of said freight car.

6. The method of mounting a plurality of vehicle bodies in a freight car which comprises detachably securing said bodies together in pairs with their lower extremities in facing relationship and their rear wheelhousing portions in registration with each other, disposing said pairs of vehicle bodies on end substantially in alignment longitudinally of said freight car with their front extremities directed downwardly and their combined normal heights extending transversely of said freight car whereby the spaces substantially enveloped between said rear wheelhousings are aligned substantially longitudinally of said freight car, inserting a bar through said longitudinally aligned spaces and mounting the same on said bodies in laterally fixed relationship with respect thereto, and urging said bar and said bodies downwardly and stabilizing the same against lateral displacement by tying said bar between successive pairs of bodies under tension in respectively opposite directions to locations on said freight car below the elevation of said bar.

7. The method of mounting vehicle bodies for transportation in a gondola type freight car which comprises detachably securing together a pair of vehicle bodies with their normal lower extremities in spaced facing relationship and their front and rear end portions opposite each other, placing a bag-shaped shroud comprising flexible sheet material over said bodies, placing said detachably secured together vehicle bodies above the upper open extremity of said gondola with their lengths disposed substantially vertically and their combined normal heights disposed transversely of said gondola, lowering said detachably secured together vehicle bodies into the space in said gondola intended for accommodation thereof, and securing said bodies against displacement relative to the walls and floor of said gondola.

8. The method of mounting a plurality of vehicle bodies in a freight car which comprises detachably securing said bodies together in pairs with their lower extremities in facing relationship and their rear wheelhousing portions in registration with each other, disposing said pairs of vehicle bodies on end substantially in alignment longitudinally of said freight car with their front extremities directed downwardly and their combined normal heights extending transversely of said freight car whereby the spaces substantially enveloped between said rear wheelhousings are aligned substantially longitudinally of said freight car, placing a bag-like shroud comprising flexible sheet material over each pair of bodies respectively, inserting a bar through said longitudinally aligned spaces and mounting the same on said bodies in laterally fixed relationship with respect thereto, and urging said bar and said bodies downwardly and stabilizing the same against lateral displacement by tying said bar between successive pairs of bodies under tension in respectively opposite directions to locations on said freight car below the elevation of said bar.

9. Apparatus for mounting vehicle bodies for transportation in a freight car comprising means for detachably securing a pair of vehicle bodies together with their normal lower extremities in facing relationship, coacting members securable to corresponding extremities of said vehicle bodies and to the floor of said freight car for supporting said bodies on end and holding their supporting ends against horizontal movement, and means for simultaneously urging said bodies downwardly and stabilizing the upper end portions thereof against movement.

10. Apparatus for mounting vehicle bodies for transportation in a freight car comprising means for detachably securing a pair of vehicle bodies together with their normal lower extremities in facing relationship, coacting members securable to corresponding extremities of said vehicle bodies and to the floor of said freight car for supporting said bodies on end and holding their supporting ends against horizontal movement, and means for simultaneously urging said bodies downwardly and stabilizing the upper end portions thereof against movement, said last mentioned means comprising tie members detachably securable to said bodies at one location and to parts of the structure of said freight car on opposite sides of the latter and at locations thereon below the elevation of attachment of said members to said bodies.

11. Apparatus for mounting vehicle bodies for transportation in a freight car comprising means for detachably securing a pair of vehicle bodies together with their normal lower extremities in facing relationship, coacting members securable to corresponding extremities of said vehicle bodies and to the floor of said freight car for supporting said bodies on end and holding their supporting ends against horizontal movement, and means for stabilizing the upper end portions of said bodies against movement comprising tension members coacting between said bodies and the structure of said freight car.

12. Apparatus for mounting vehicle bodies for transportation in a freight car including means for securing a pair of bodies together with their normal lower extremities in spaced facing relationship comprising connecting members securable to portions of said bodies normally provided for attachment to a vehicle chassis, a pair of said connecting members being securable to the normal front end portions of said bodies in forwardly protruding relationship with respect thereto, coacting members on the front extremities of said bodies and on the floor of said freight car respectively for supporting said bodies on end in vertically upstanding positions, members on the floor of said freight car for coacting with said latter pair of connecting members for holding the supporting end portions of said body against horizontal displacement, and tension members connected between said bodies and the structure of said freight car for holding the sides of said bodies in spaced relation to said freight car.

13. Apparatus for mounting vehicle bodies for transportation in a freight car including means for securing a pair of bodies together with their normal lower extremities in spaced facing relationship comprising spaced pairs of connecting members, one pair being located adjacent and extending in advance of the front ends of said bodies and the other pair being located adjacent and extending rearwardly of the forwardmost portions of the wheelhousings of said bodies, and means coacting between said pairs of connecting members and the structure of said freight car for supporting said vehicle bodies on end in spaced relation to the walls of said freight car.

14. Apparatus for mounting a plurality of pairs of vehicle bodies on end in alignment longitudinally of a freight car for transportation therein comprising spaced pairs of connecting members, one pair being located adjacent the front ends of said vehicle bodies and the other adjacent and extending in advance of the forwardmost portions of the rear wheelhousings thereof, a bar extending longitudinally of said freight car and mounted on the latter connecting members of each pair of bodies, means for supporting said bodies on their normal front ends in vertically upright position, and tension members connected between said bar and location on said freight car below the elevation of said bar for urging said bodies downwardly and stabilizing the latter against movement.

CHARLES S. LORD.